United States Patent
Husted et al.

[19]

[11] Patent Number: 6,142,552

[45] Date of Patent: Nov. 7, 2000

[54] THIRD AUTOMOTIVE SEAT ASSEMBLY FOR AN AUTOMOTIVE VEHICLE

[75] Inventors: Daniel Watson Husted, Saline; Ronald Martin Lovasz, Allen Park, both of Mich.

[73] Assignee: Lear Corporation, Southfield, Mich.

[21] Appl. No.: 09/132,914

[22] Filed: Aug. 12, 1998

Related U.S. Application Data

[63] Continuation of application No. 08/698,350, Aug. 15, 1996, abandoned.

[51] Int. Cl.⁷ ..................................................... B60N 2/02
[52] U.S. Cl. .................. 296/65.09; 297/337; 297/378.12
[58] Field of Search .............................. 296/65.03, 65.05, 296/65.09, 69; 297/337, 378.1, 378.12

[56] References Cited

U.S. PATENT DOCUMENTS

| | | |
|---|---|---|
| 1,427,280 | 8/1922 | Gahm . |
| 1,668,167 | 5/1928 | McKenna . |
| 2,916,325 | 12/1959 | Estes et al. . |
| 2,926,948 | 3/1960 | Koplin et al. .................. 297/378.12 X |
| 2,956,837 | 10/1960 | Koplin . |
| 3,001,820 | 9/1961 | Morphew . |
| 3,311,405 | 3/1967 | Brennan et al. . |
| 3,600,033 | 8/1971 | Holdampf et al. . |
| 4,124,250 | 11/1978 | Weinich . |
| 4,186,960 | 2/1980 | Mizelle . |
| 4,194,782 | 3/1980 | Itoh . |
| 4,779,917 | 10/1988 | Campbell et al. . |
| 4,869,541 | 9/1989 | Wainwright . |
| 4,932,706 | 6/1990 | Wainwright et al. . |
| 4,932,709 | 6/1990 | Wainwright . |
| 5,044,683 | 9/1991 | Parsson . |
| 5,238,285 | 8/1993 | Holdampf et al. . |
| 5,248,178 | 9/1993 | Brambilla . |
| 5,282,662 | 2/1994 | Bolsworth et al. . |
| 5,364,152 | 11/1994 | Mastrangelo et al. . |
| 5,368,355 | 11/1994 | Hayden et al. . |
| 5,393,116 | 2/1995 | Bolsworth et al. . |
| 5,482,349 | 1/1996 | Richter et al. . |
| 5,492,386 | 2/1996 | Callum . |
| 5,498,051 | 3/1996 | Sponsler et al. . |
| 5,570,931 | 11/1996 | Kargilis et al. . |
| 5,692,802 | 12/1997 | Aufrere et al. ........................... 297/337 |
| 5,904,404 | 5/1999 | McCulloch et al. ................ 297/378.12 |
| 5,934,732 | 8/1999 | Jakubiec ................................. 296/69 X |

FOREIGN PATENT DOCUMENTS

| | | |
|---|---|---|
| 2605564 | 10/1987 | France . |
| 361278443 | 12/1986 | Japan .................................. 296/65.09 |

*Primary Examiner*—Dennis H. Pedder
*Attorney, Agent, or Firm*—Brooks & Kushman P.C.

[57] ABSTRACT

A third seat for an automotive vehicle having a front seat assembly and a rear seat assembly, the latter being located intermediate the front seat assembly and the third seat assembly, the third seat assembly comprising a seat portion and an upright back support portion, the seat portion being supported by a linkage mechanism on a seat frame, the linkage mechanism providing articulation that permits the seat portion to be moved forwardly toward a second seat assembly without the necessity of tiling and inverting the seat portion about a pivotal axis whereby the seat portion forms a cargo-carrying platform, the upright back support portion being foldable in a forward direction to form a continuation of the platform, the third seat assembly including a lock on the seat portion that prevents folding movement of the upright back support portion when the third seat portion functions as a passenger seat, the lock being released automatically as the seat portion articulates toward its cargo-carrying position.

4 Claims, 9 Drawing Sheets

THIRD AUTOMOTIVE SEAT ASSEMBLY FOR AN AUTOMOTIVE VEHICLE

REFERENCE TO RELATED APPLICATION

This is a continuing application based on U.S. patent application Ser. No. 08/698,350, filed Aug. 15, 1996, now abandoned, and entitled "THIRD AUTOMOTIVE SEAT ASSEMBLY FOR AN AUTOMOTIVE VEHICLE".

TECHNICAL FIELD

This invention relates to a rear seat assembly for a vehicle passenger compartment and to improved means for converting the rear seat assembly into a cargo-carrying platform.

BACKGROUND OF THE INVENTION

It is known in the art of automotive vehicle body design to provide forward seat assemblies for a driver and a front passenger, a rear seat assembly, and an intermediate seat assembly located at a mid-vehicle position. An example of such an arrangement is disclosed in U.S. Pat. No. 4,932,709.

The vehicle of the '709 patent disclosure is a so-called mini-van having a side entry sliding door and a rear access door. The side entry door permits entry of passengers to either the intermediate seat or the rear seat assemblies. The rear door permits access to a storage platform for carrying cargo.

The rear seat assembly of the '709 patent includes a seat-back support portion that may be folded forward over its seat portion. A seat back support portion of the intermediate seat assembly also may be tilted forward over its seat portion about an axis located at the rearward edge of the seat portion so that the seat back support portion forms a cargo-carrying platform as an extension of a cargo-carrying platform defined by the seat back portion of the rear seat assembly. If desired, the seat back support portion of the rear seat assembly may be folded forward independently of the intermediate seat assembly so that the bottom of the folded seat portion may form a partial extension of a permanent cargo-carrying platform. The side entry door may be used to access the enlarged cargo-carrying space when the intermediate and the rear seat assemblies are folded in this fashion.

BRIEF DESCRIPTION OF THE INVENTION

The improvements of our invention are particularly adaptable for seat assemblies for sport utility vehicles that generally are smaller than so-called mini-van vehicles such as the vehicle disclosed in the '709 patent. Unlike the mini-van design of the '709 patent, a sport utility vehicle has minimal storage space at the rear of the rear-most seat assembly, although the vehicle itself is capable of accommodating three rows of seats as in the case of the mini-van of the '709 patent.

Like the design of the rear seat assembly of the '709 patent, the seat assembly of our invention is capable of carrying passengers when it is in one operating mode and is capable of forming an extension of a cargo-carrying platform when it is in a folded condition. The improved design of our invention, however, includes a seat portion for the rear seat assembly that is supported on a seat frame by an articulated linkage mechanism that will permit the seat portion of the rear seat assembly to be moved forward so that it will overlie the space between the rear and intermediate seat assemblies, thereby permitting the upper surface of the seat portion of the rear seat assembly to function as an extension of a cargo-carrying surface.

Unlike the design of the '709 patent, which provides for tilting movement of the seat portion about a forward tilt axis which inverts the seat portion for cargo-carrying purposes, the seat portion of our improved seat assembly, by reason of the articulation of the linkage mechanism, will permit the seat portion to move to its cargo-carrying position with the top of the seat portion facing upward rather than downward as in the case of the '709 patent. The articulated relationship of the seat portion with the seat frame assembly allows the upper surface of the seat portion to form a portion of a load-carrying platform. After the seat portion is moved forward in this fashion, the seat back support portion may be folded forward, thereby defining an extension of a load-carrying platform that generally is in the plane of the upper surface of the forwardly positioned seat portion.

According to another feature of our invention, provision is made for locking the seat back support portion of the rear seat assembly in an upright position when the rear seat assembly is used to carry passengers. The locking of the upright seat back support portion is achieved as the seat portion of the third, rear seat assembly is moved rearwardly. The rear margin of the seat portion of the third seat assembly, together with the base of the upright seat back support portion in the vicinity of the pivot axis of the upright seat back support portion, forms an interlock which prevents forward tilting movement of the upright seat back support portion whenever the seat portion of the rear seat assembly is in its passenger carrying position. Thus, the seat back support portion can be locked in place without the necessity for separate mechanical linkages to lock and unlock the rear seat back support portion, thereby making the tilting motion and locking of the rear seat back support portion more reliable as well as less costly than known seat back lock mechanisms that would be required to hold the seat back in an upright position and to permit tilting movement for cargo-carrying purposes.

PARTICULAR DESCRIPTION OF THE INVENTION

Figure 1:
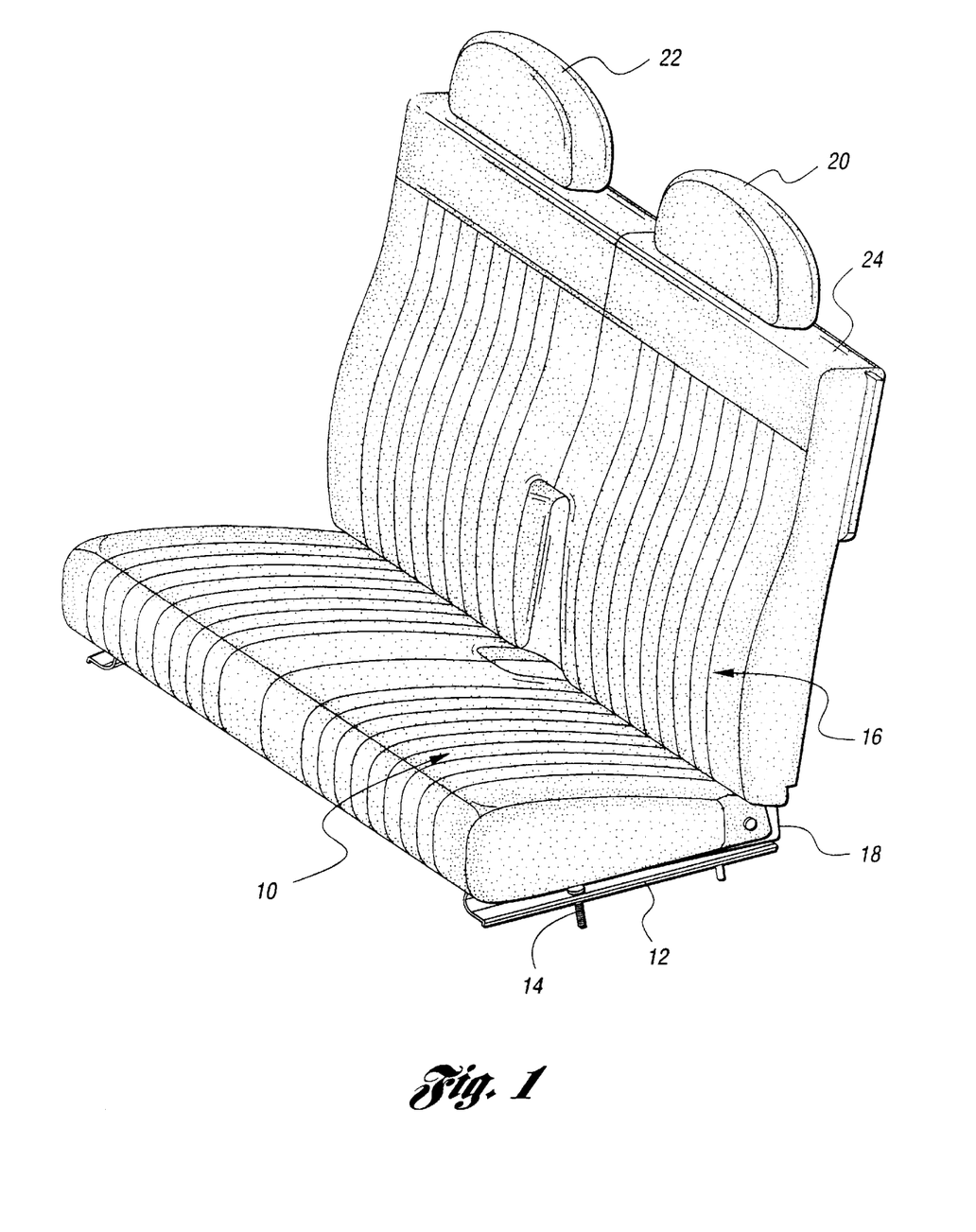
FIG. 1 is an isometric view of a seat assembly of the kind that may be used in a sport utility vehicle as a rear or third seat.

In FIG. 1, numeral 10 designates generally a seat portion of a rear seat assembly for a sport utility vehicle. It is mounted on a seat assembly frame with side members 12 that may be bolted by anchor bolts 14 to the floor pan of the vehicle. The upright seat back support portion of the rear seat assembly shown at 16 is secured by supporting bracket structure 18 to the seat frame assembly side members 12. Provision is made for mounting head rests 20 and 22 at the upper margin 24 of the seat back support portion 16.

The seat portion 10 and the seat back support portion 16 are covered by cushioned material. This obscures in FIG. 1 the internal cushion supporting structure, which will be described in detail with reference to the other figures.

Figure 2:
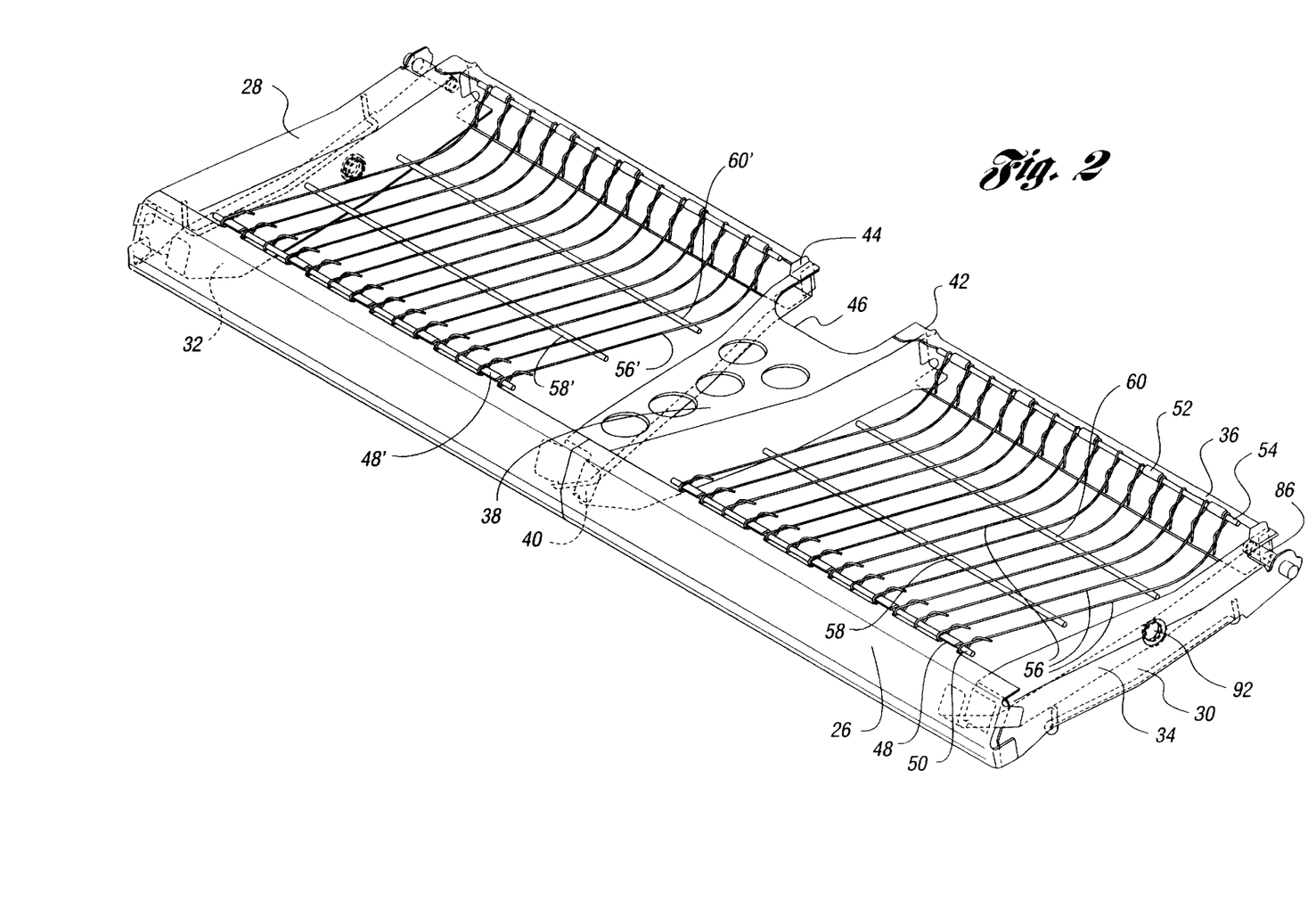
FIG. 2 is an isometric view of the seat portion of a third seat assembly of the kind illustrated in FIG. 1 without the cushion for the seat assembled.

The seat portion 10 comprises a frame illustrated in the perspective view of FIG. 2. The frame includes a transversely situated front frame member 26 and right and left seat frame members 28 and 30. The frame members 28 and 30 are formed as hollow channel structures having vertical sides 32 and 34, which are secured at their fore-and-aft ends to the forward member 26 and a corresponding rearward member 36. Located midway between the side members 28 and 30 is a central structural channel member 38 secured at its forward end to the forward member 26 as shown at 40. It is secured at its rearmost end to the rearmost member 36 as shown at 42 and 44.

In the embodiment shown in FIG. 2, the rearmost member 36 is separated at its center into two sections, one section being secured at 42 to the channel member 38, and the other section being secured at 44 to the channel member 38. Recess 46 is formed in the channel member 38 to provide an access opening for receiving seat belts for a right rear passenger and a left rear passenger. The seat belts that extend through the opening 46 may be secured by seat belt anchor bolts to seat belt anchor portions of the vehicle floor pan.

The upper margin of the forward member 26 is provided with eyelets 48 through which an anchor rod 50 extends. A corresponding series of eyelets 52 is formed on the upper margin of the rear member 36, and anchor rod 54 extends through the eyelets 52 as shown.

A series of cushion supporting rods 56 extends between the anchor rod 50 and the anchor rod 54. The ends of the rods 56 are tied, as shown, to the anchor rods 50 and 54 to provide end support.

Reinforcing rods 58 and 60 extend transversely, and the rods 56 are secured to them by welding, thereby providing a stable cushion support.

The portion of the seat assembly on the opposite side of the channel member 38 is essentially a duplicate of the portion described in the foregoing paragraphs. It includes cushion support rods 56' and rods 58' and 60' which are assembled together to form an integrated support for the cushion. Elements of the seat assembly on one side of member 38 that have counterpart elements on the other side of member 38 have common reference numerals, although prime notations have been added to one set of reference numerals.

Figures 3, 8:
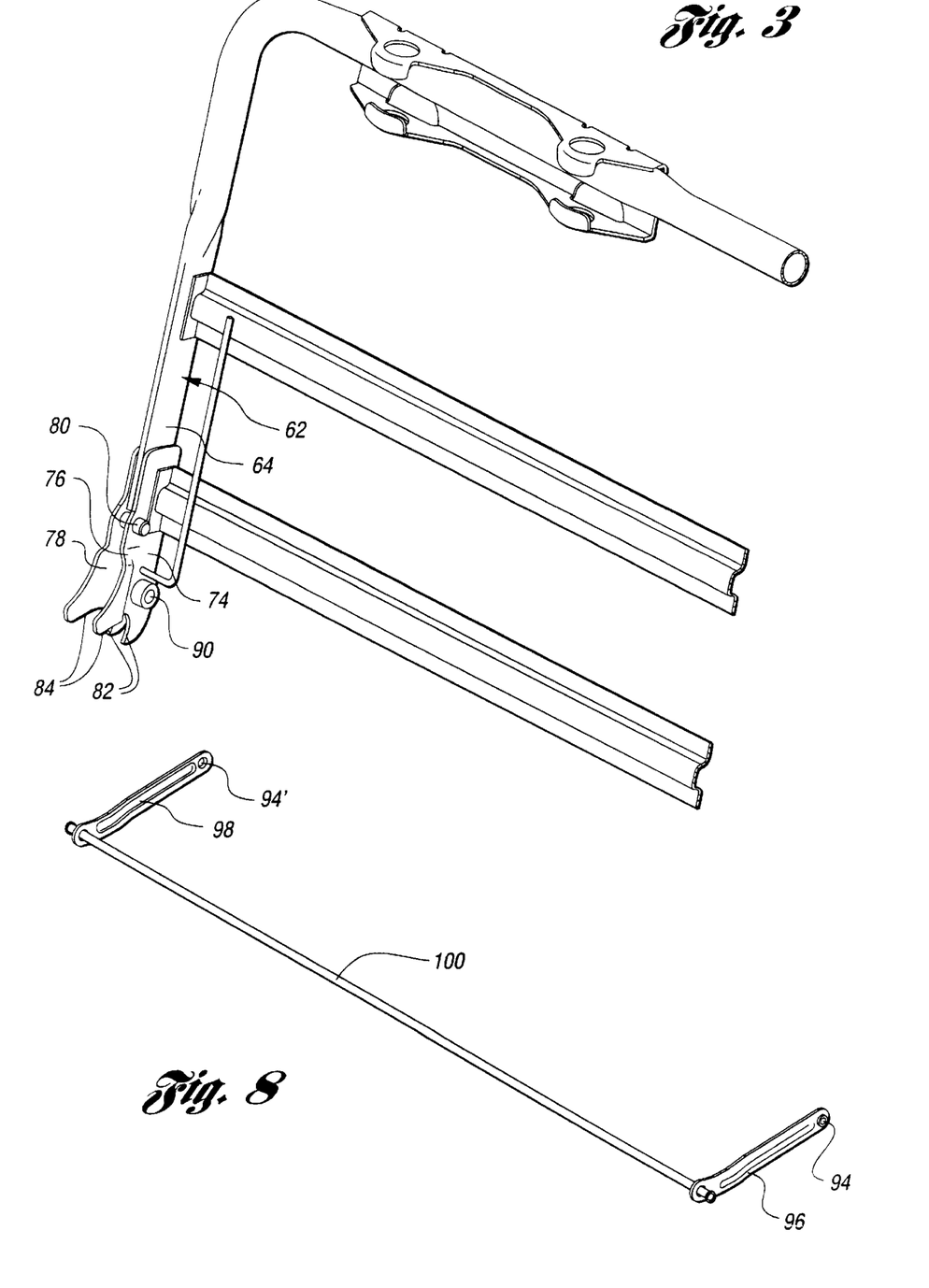
FIG. 3 is a partial isometric view of the upright seat back support portion of the rear seat assembly as shown in FIG. 1.
FIG. 8 is an isometric view of a torque tube assembly that forms a part of the linkage which provides an articulated connection between the seat frame and the seat portion of the rear seat assembly.
Figure 4:
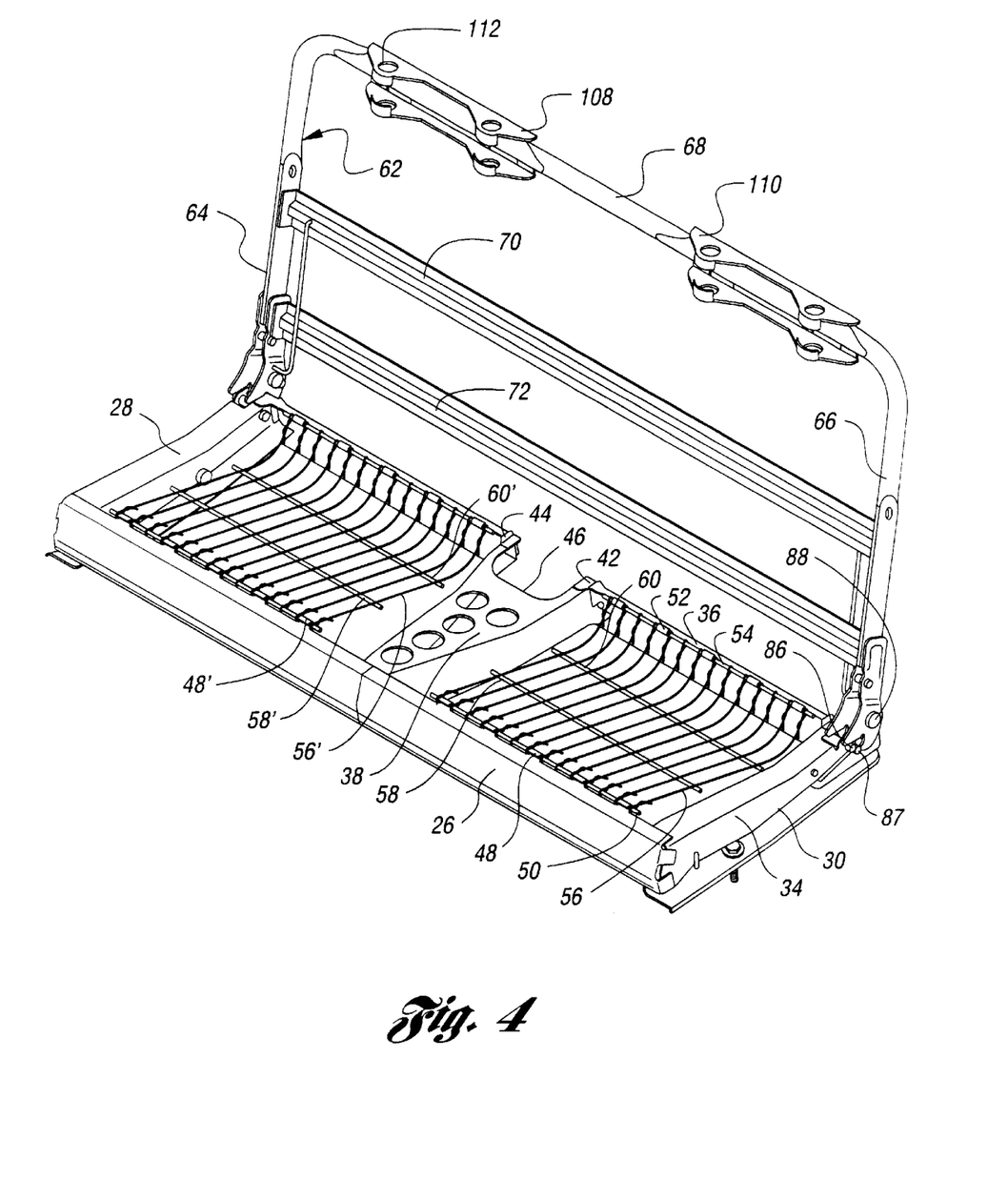
FIG. 4 is an assembled view of the rear seat assembly of FIG. 1 when the upright seat back portion is locked in place by the assembled seat portion, the illustration of FIG. 4 omitting the seat cushion illustrated in FIG. 1 to permit in greater detail observation of the seat supporting structures.

Referring next to FIGS. 3 and 4, the supporting structure for the back support portion 16 is shown in more particular detail. It includes a structural tube frame 62 having a first upright segment 64 and a second upright segment 66 located on opposite ends of the third seat assembly. The upper end of the segments 64, 66 are joined by a laterally extending horizontal structural tube frame segment 68. A pair of structural cross members in the form of structural channels is shown at 70 and 72. The ends of the cross members 70, 72 are joined by welding to the segments 64 and 66.

Figure 5:
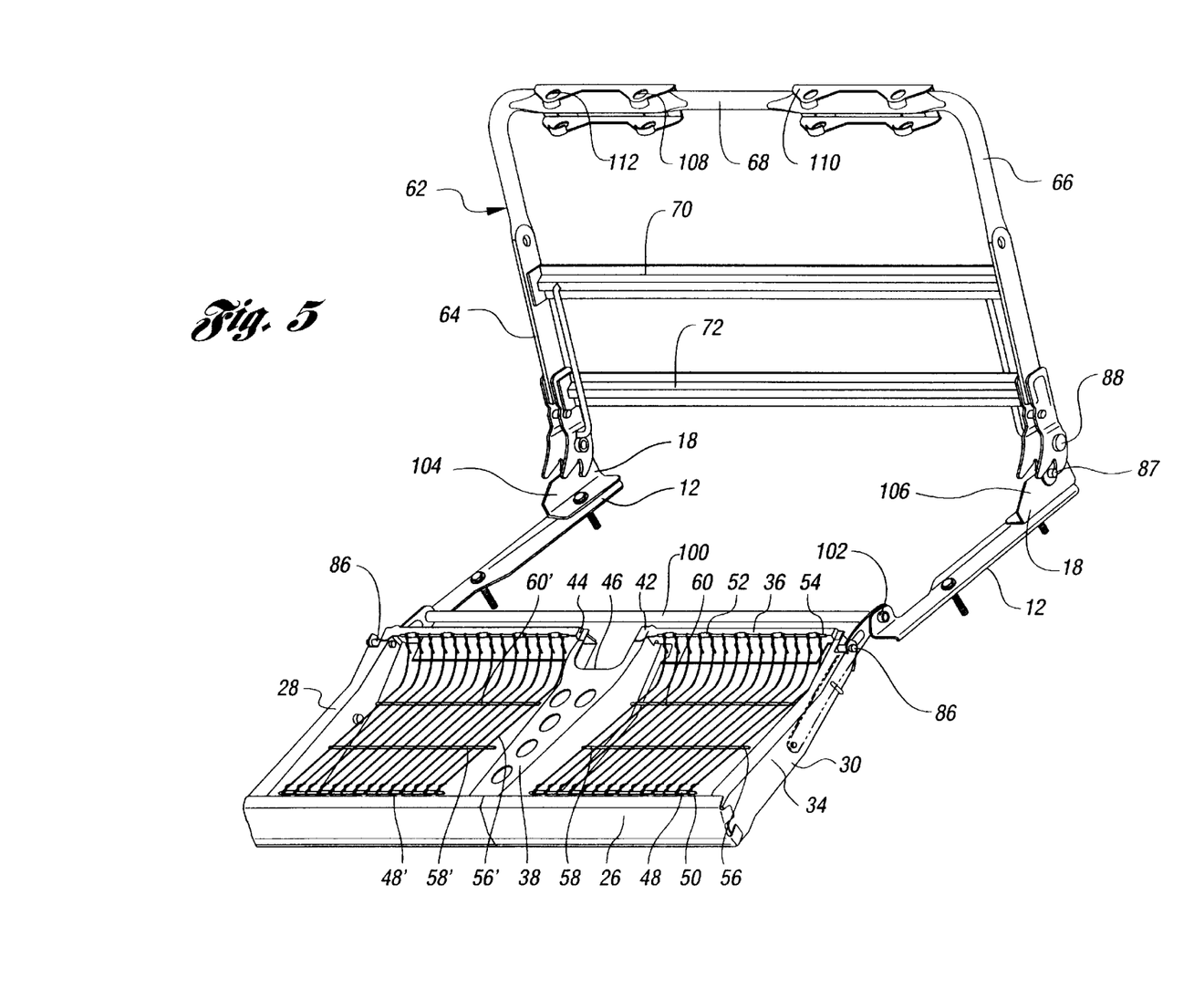
FIG. 5 is a view similar to FIG. 4, although the seat portion is shown folded forward to its cargo-carrying position.
Figure 6:
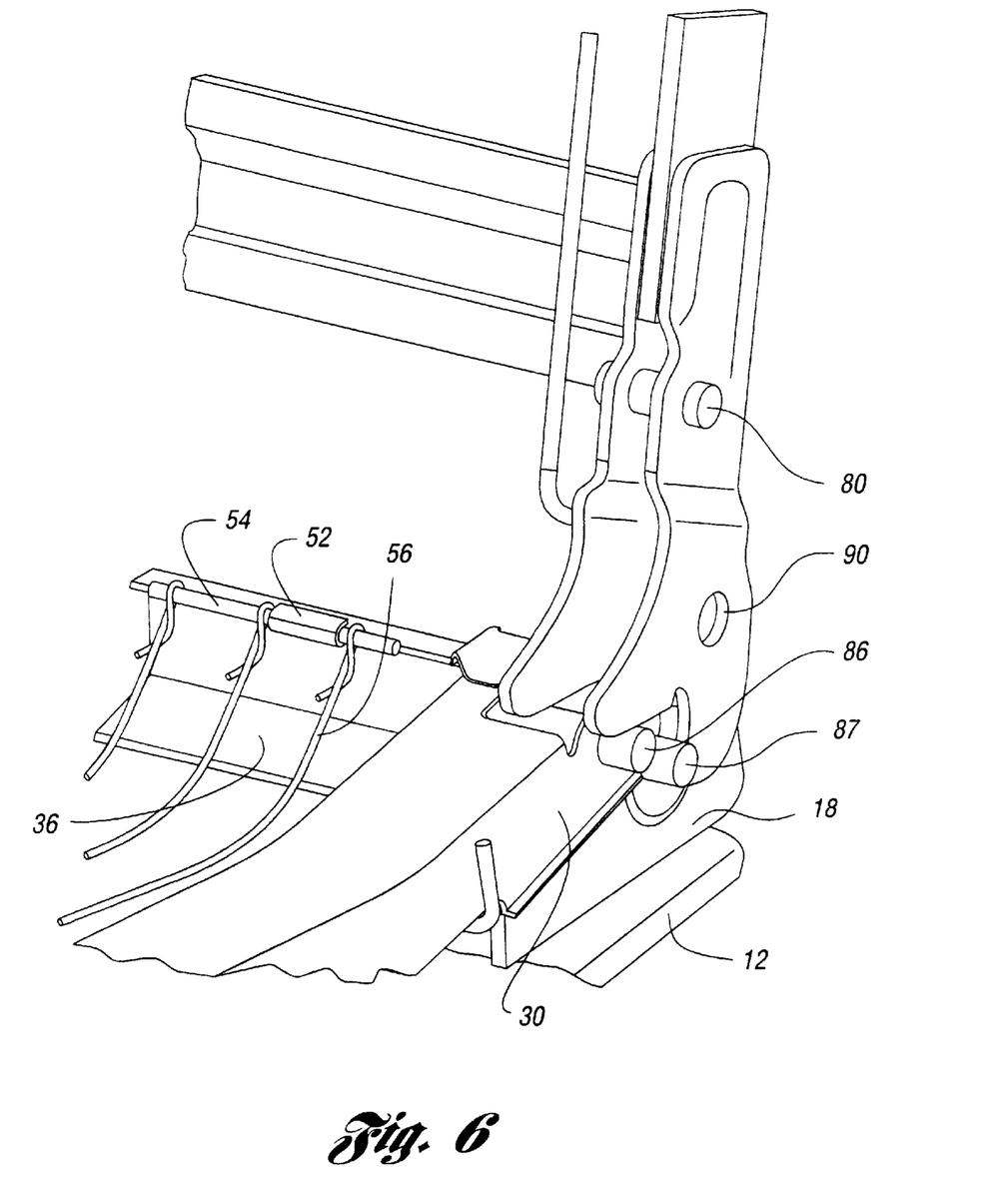
FIG. 6 is an enlarged view of the interlock between the upright seat back support portion and the seat portion of the mechanism illustrated in FIGS. 4 and 5.
Figure 9:
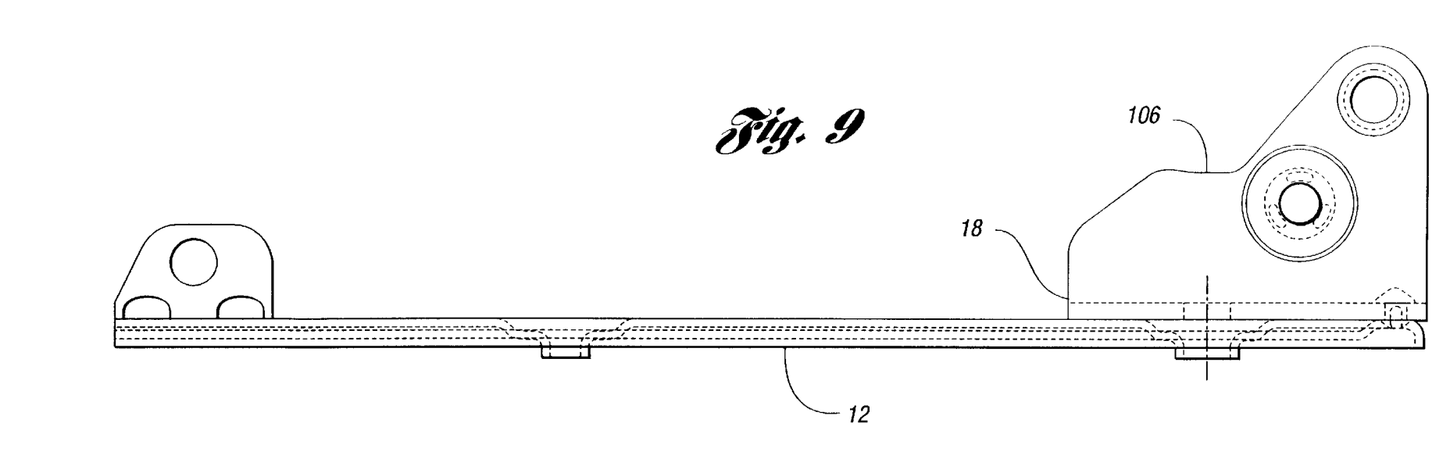
FIG. 9 is a side view of a portion of a seat assembly support bracket with a wedge surface that forms a part of an interlock between the frame of the seat portion and the frame of the upright seat back support portion.
Figure 9A:
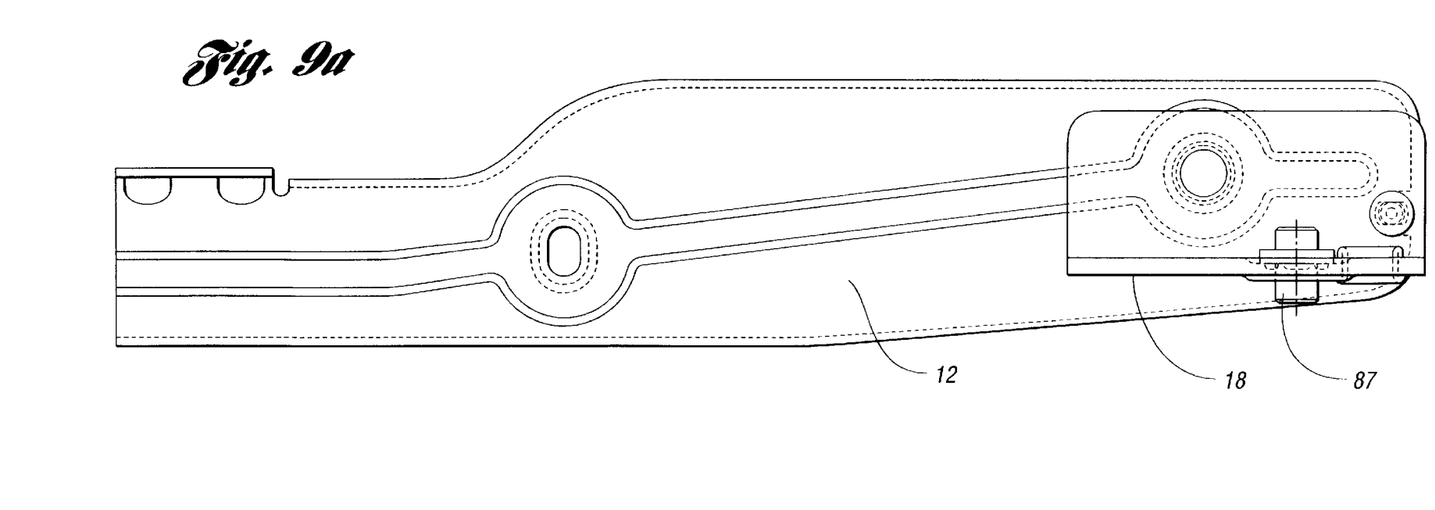
FIG. 9a is a top view of the bracket shown in FIG. 9.

The lower end of segment 64, as seen in FIG. 3, is joined to a bracket 74, the cross-section of which generally forms a U-channel. Bracket 74 comprises spaced parallel side walls 76 and 78 which are joined together by a stub shaft 80 secured by a press fit or other attachment means within openings formed in the side portions 76 and 78. The lower end of bracket 74, as seen in FIG. 3, is recessed, as shown at 82 and at 84 at the side members 76 and 78, respectively. The surface deemed by recesses 82 and 84 are best seen in FIG. 3. Stub shafts 86 are secured at each of their ends in the spaced walls of the side frame members 28 and 30, thereby defining a part of the rear frame margin. The frame 62 is adapted to pivot forwardly about the axis of pivot shafts 88, which are received within openings 90. When the frame 62 is pivoted to the position shown in FIG. 4, the surfaces of recesses 82 and 84 engage stub shafts 86 and 87, respectively, thereby providing a stop that limits the pivoting motion forwardly and rearwardly. Shafts 87 are secured to brackets 18 as seen in FIGS. 5, 6 and 9a.

The side member 30, shown in FIG. 2, has an opening 92 which receives a pivot pin that is received in opening 94 in linkage member 96 seen in FIG. 8. Linkage member 96 and linkage member 98 at the opposite side of the rear seat assembly are joined together by a cross member 100.

Referring next to FIG. 8, a torque tube frame assembly including the cross member 100 is shown in detail. One end of the cross member 100 is secured within an opening formed in one frame side member 12 as seen at 102 in FIG. 5. The opposite end of the cross member 100 is secured in a corresponding opening formed in opposite side member 12. The opposite end of the member 100 is joined to the linkage member 98, as seen in FIG. 8. A pivot pin corresponding to the pin in opening 92 is received in opening 94' as seen in FIG. 8.

When the lower seat portion is in the position shown in FIG. 4, the torque tube essentially is obscured by the structural side members 28 and 30. The linkage members 96 and 98 then are located within the openings between the sides 34 and 32 of the side members 30 and 28.

The lower seat portion may be moved to the position shown in FIG. 5 from the position shown in FIG. 4 by lifting the forward edge of the lower seat portion and then displacing it forward as the torque tube assembly rotates about the axis of the cross member 100. The linkage members 96 and 98 rotate during this motion through an angle of approximately 180° from the position shown in FIG. 4 to the position shown in FIG. 5.

When the seat assembly then is moved from the position shown in FIG. 5 to the position shown in FIG. 4, it first is raised, which initiates the pivotal movement of the torque tube assembly. It then is moved rearwardly to the position shown in FIG. 4 until stub shafts 86 carried by members 28 and 30 engage the surfaces defined by the recesses 82 and 84'. The ends of each stub shaft 86 at this time are wedged against surfaces 104 and 106 of brackets 18 as seen in FIGS. 5 and 9.

When the upright seat back portion 16 is positioned as shown in FIGS. 4 and 5, and when the margin of the lower seat portion assumes the position shown in FIGS. 4 and 6, the ends of the stub shafts 87 and 86 become wedged between surfaces of the recesses 84 and the wedge surfaces 104 and 106 of brackets 18, thereby locking the upright seat back support portion in place in a secure fashion without the necessity for any additional linkage or locking devices. The wedging surfaces 104 and 106 of the support bracket structure are seen in FIGS. 5 and 9.

The upper segment 68 of the frame 62 for the upright seat back support portion includes a pair of head rest supporting brackets shown at 108 and 110. These are provided with openings 112, which are adapted to receive support rods for the head rests shown in FIG. 1 at 20 and 22.

The dimensional tolerances for the articulating linkage mechanism for the seat assembly is designed to permit a limited degree of elastic deformation when the ends of the stub shafts 86 are wedged in place between the surfaces 106 and 104 of brackets 18 and the surfaces of the recesses 84. The geometry of the torsion bar assembly, specifically the location of the pivot axis for member 100 with respect to the location of the pivot point corresponding to openings 94 and 94' in the torsion bar assembly, is designed with a controlled degree of over-center movement that provides for a snap action when the lower rear seat portion is adjusted to the position shown in FIG. 4. This has the effect of securely holding the lower seat portion in place while simultaneously locking in place the frame structure for the upright rear seat support.

Figure 10A:
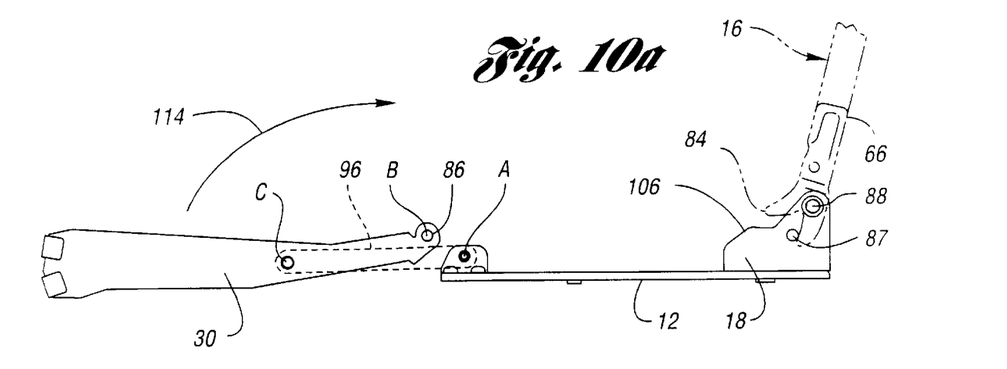
FIGS. 10a, 10b, 10c and 10d show various positions of the lower seat portion together with the articulated linkage as the lower seat portion is moved from a forward cargo-carrying position to a rearward passenger-supporting position.
Figure 10B:
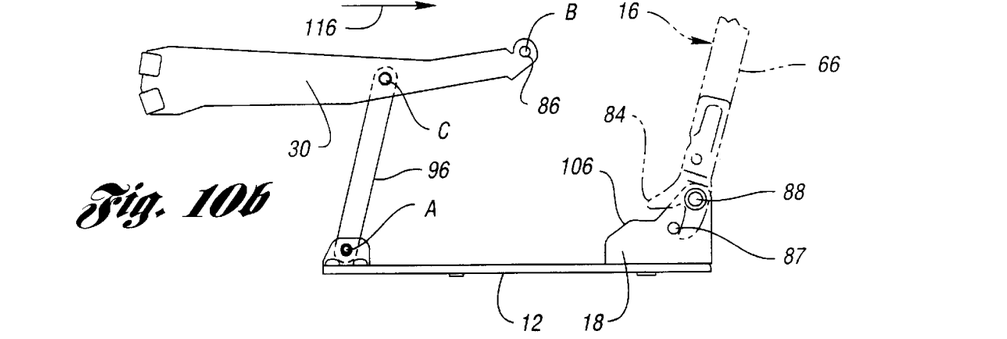

FIG. 10*a* shows the lower seat portion extended to its forward cargo-carrying position when the lower seat portion and frame side member 30 is moved in the direction of the arcuate arrow 114 shown in FIG. 10*a* to the position shown in FIG. 10*b*. The stub shaft 86 moves closer to the wedge surface 106 on bracket 18. The linkage member rotates in a clockwise member about pivot point "A". Pivot point "C", where the linkage member 96 is pivoted to the side member 30, moves in a generally tangential direction as shown by directional arrow 116.

Figure 10C:
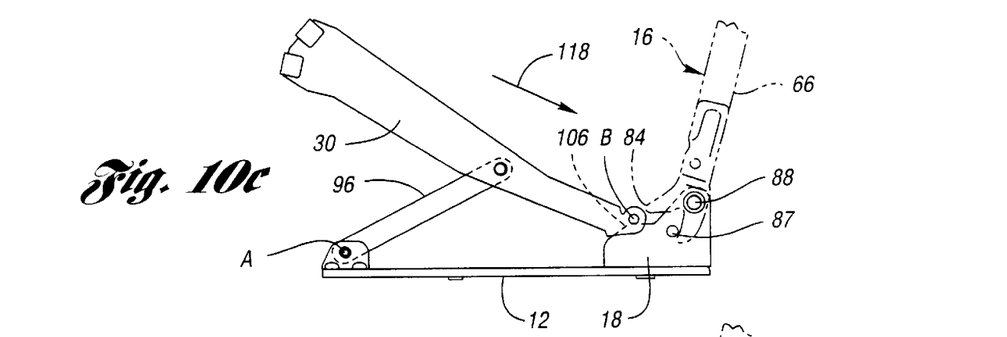

When the lower seat portion and side member 30 is moved to the position shown in FIG. 10*c*, the stub shaft 86 contacts the wedge surface 106 which, for purposes of illustration, has a reference axis "B". Stub shaft 86, when it is positioned as shown in FIG. 10*c*, approaches the lower end of the upright segment 66 of the back support portion 16. It begins to enter the recess in the lower portion of segment 66, as shown at 84.

Figure 10D:
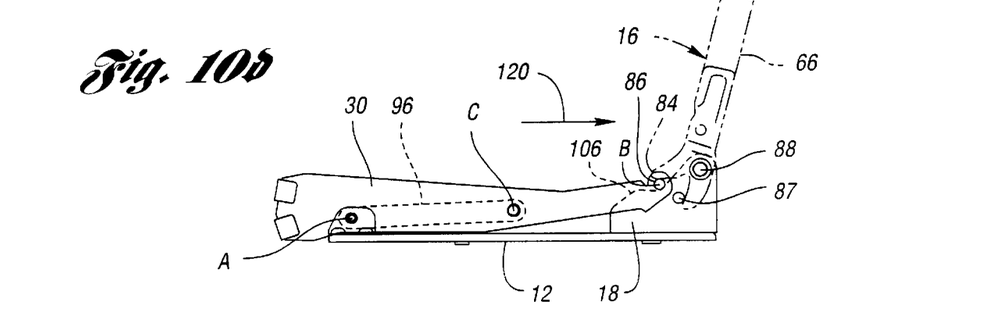

In FIG. 10*d*, the lower seat portion has entered the recess shown at 84 in the segment 66 of the back support portion and is ready to be snapped in place. At that instant, the distance between point A and point B is slightly less than the sum of the distances between point A and point C and between point C and point B.

The materials of which the articulated linkage for the lower seat portion are made have sufficient resiliency so that the linkages will yield elastically, thereby permitting the lower seat portion side members 30 to be snapped in place as point C shown in FIG. 10*d* passes the over-center position represented by line AB. The lower seat portion then will remain locked in place. The seat back supporting structure also will be locked in place against forward movement because of the locking action of the stub shaft 86 as the stub shaft 86 moves over the wedging surface 106. Rearward tilting movement of the upper seat back supporting structure is prevented by the stub shaft 87 which engages the lower extremity of the segment 66.

In moving from the position shown in FIG. 10*d* to the fully locked position, the lower seat portion causes the linkage to yield elastically. FIG. 10*d* shows the unstressed linkage position. When the lower seat portion reaches its over-center position with the interlock elements secured in place, the linkage elements yield elastically.

Reference numeral 118 designates in FIG. 10*c* the direction of movement of point B as the stub shaft 86 approaches the wedging surface of the bracket 18. Directional arrow 120 shown in FIG. 10*d* shows the direction of movement of the point B as it moves across the wedging surface of the bracket 18.

In seat installations for sport utility vehicles, a limited amount of space is available between the front edge of the third seat and the rear of the intermediate or second seats. A side entry door will permit access to that space. If the second row seats are folded forwardly and the lower seat portion of the second row seats then are pivoted about the forward edge of the rear of the lower seat portion, access to the third or rear seats then readily is made available. This will facilitate adjustment of the lower seat portion 10 to the position shown in FIG. 4 or to the position shown in FIG. 7.

Figure 7:
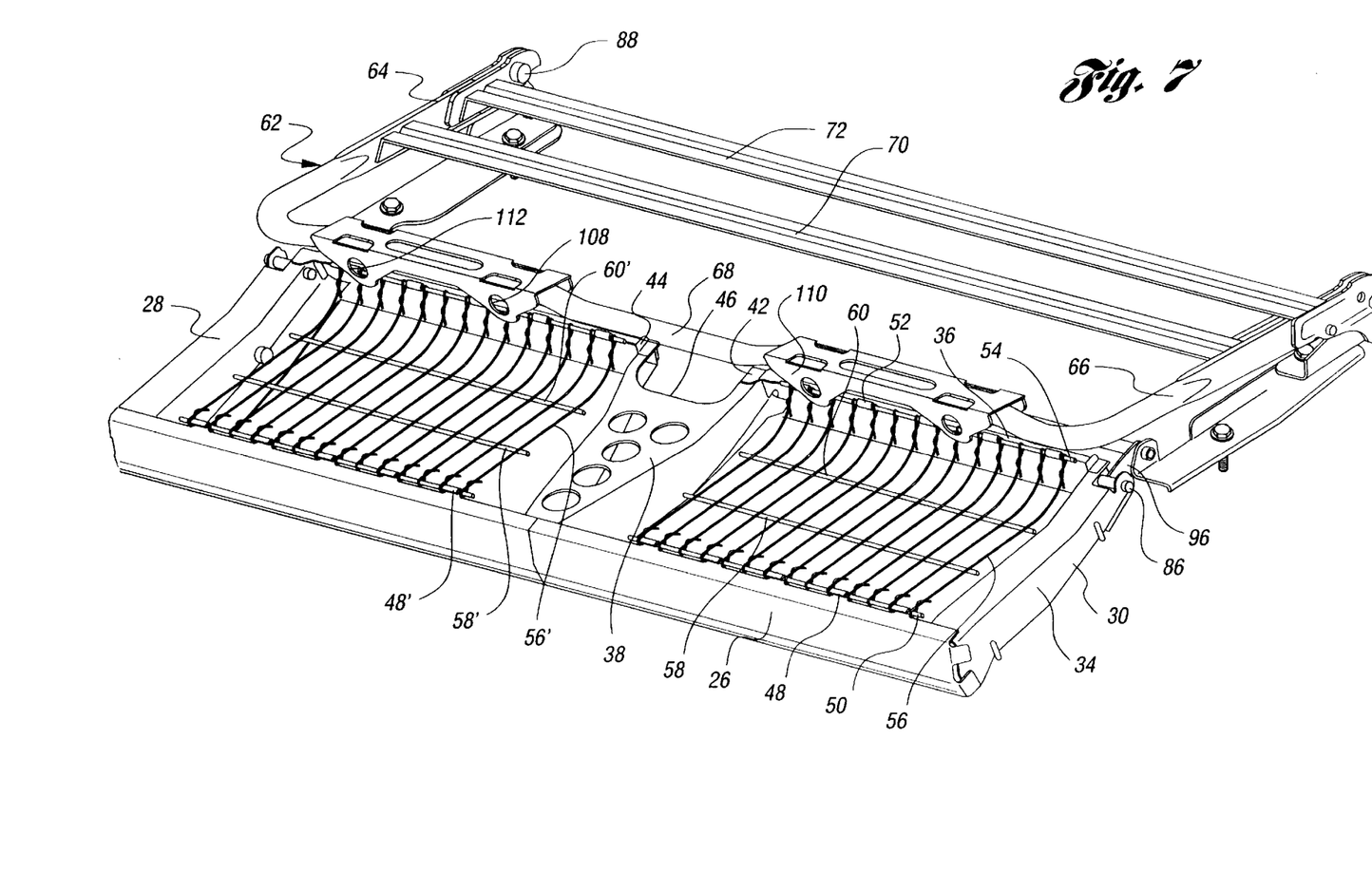
FIG. 7 is a view similar to FIG. 5, although it illustrates an upright seat back support portion folded to the cargo-carrying position.

As seen in FIG. 7, the frame structure for the upright rear seat back support portion, when tilted forward about the axis of each pivot shaft 88, is essentially in a plane parallel to the plane of the lower seat portion, thereby providing a convenient cargo-carrying platform.

This articulating motion of the lower seat portion and the upright rear seat back support portion makes it possible to establish a cargo-carrying platform without inverting the cushion for the lower seat portion. Further, this function is achieved without substantial variation from a horizontal disposition of the cargo-carrying surface. Any deviation of the cargo-carrying surface from the horizontal position can be limited to a 4° slope or less.

Having described a preferred embodiment of our invention, what we claim and desire to secure by U.S. Letters Patent is:

1. A seat assembly for a vehicle passenger compartment said seat assembly comprising a lower seat portion for supporting passengers mounted in a generally horizontal plane and a seat back support portion with a lower margin mounted in a generally upright position;

a frame for said lower seat portion comprising a forward frame member at a forward margin of the lower seat portion, a rear frame member at a rear margin of the lower seat portion and right and left frame members;

seat support structure, the lower margin of said seat back support portion being pivotally mounted on said support structure; and a mounting lever pivotally connected at one end to said lower seat portion frame at a location intermediate forward and rearward margins of said lower seat portion, the other end of said mounting lever being pivotally connected to said support structure whereby said lower seat portion may be moved forward relative to said support structure from a passenger-supporting position to a second position that is forward of the passenger-supporting position, said lower seat portion having a passenger seating surface that faces upward when it assumes each of said positions;

said support structure and said rear frame margin comprising interlock means for locking said seat back support portion to said support structure thereby preventing rotary movement of said seat back support portion when said lower seat portion is moved to said passenger-supporting position;

said interlock means comprising a bracket element on said seat back support portion, said bracket element and said support structure defining a recess with wedging surfaces, said surfaces being engageable by said rear frame margin thereby locking said seat back support portion when said lower seat portion is in said passenger-supporting position.

2. A seat assembly for a vehicle passenger compartment, said seat assembly comprising a lower seat portion for supporting passengers mounted in a generally horizontal plane and a seat back support portion with a lower margin mounted in a generally upright position;

a frame for said lower seat portion comprising a forward frame member at a forward margin of the lower seat portion, a rear frame member at a rear margin of the lower seat portion and right and left frame members;

support structure, the lower margin of said seat back support portion being pivotally mounted on said support structure; and a mounting lever pivotally connected at one end to said lower seat portion frame at a location intermediate forward and rearward margins of said lower seat portion, the other end of said mounting lever being pivotally connected to said support structure whereby said lower seat portion may be moved forward relative to said support structure from a passenger-supporting position to a second position that is forward of the passenger-supporting position, said lower seat portion having a passenger seating surface that faces upward when it assumes each of said positions;

said support structure and said rear margin of the lower seat portion comprising interlock means for locking said seat back support portion to said support structure thereby preventing rotary movement of said seat back support portion when said lower seat portion is moved to said passenger-supporting position;

said interlock means comprising a bracket element on said seat back support portion, said bracket element and said support structure defining a recess with wedging surfaces, said surfaces being engageable by said rear margin of said lower seat portion thereby locking said seat back support portion when said lower seat portion is in said passenger-supporting position;

wherein in the passenger-supporting position the mounting lever pivotal connection to the lower seat portion is located below a straight line extending between the mounting lever pivotal connection to the support structure and the rear margin of the lower seat portion to form an over center locking arrangement.

3. The seat assembly set forth in claim 1 wherein the lower seat portion and the mounting lever provide articulation of the lower seat portion to effect forward movement thereof without tilting and inverting the lower seat portion, the lower seat portion defining a cargo-carrying platform;

the seat back support portion forming a continuation of the cargo-carrying platform when it is folded forward following forward movement of the lower seat portion.

4. The seat assembly set forth in claim 2 wherein the mounting lever provides articulation of the lower seat portion to effect forward movement thereof without tilting and inverting the lower seat portion, the lower scat portion defining a cargo-carrying platform;

the seat back support portion forming a continuation of the cargo-carrying platform when it is folded forward following forward movement of the lower seat portion.

* * * * *